UNITED STATES PATENT OFFICE.

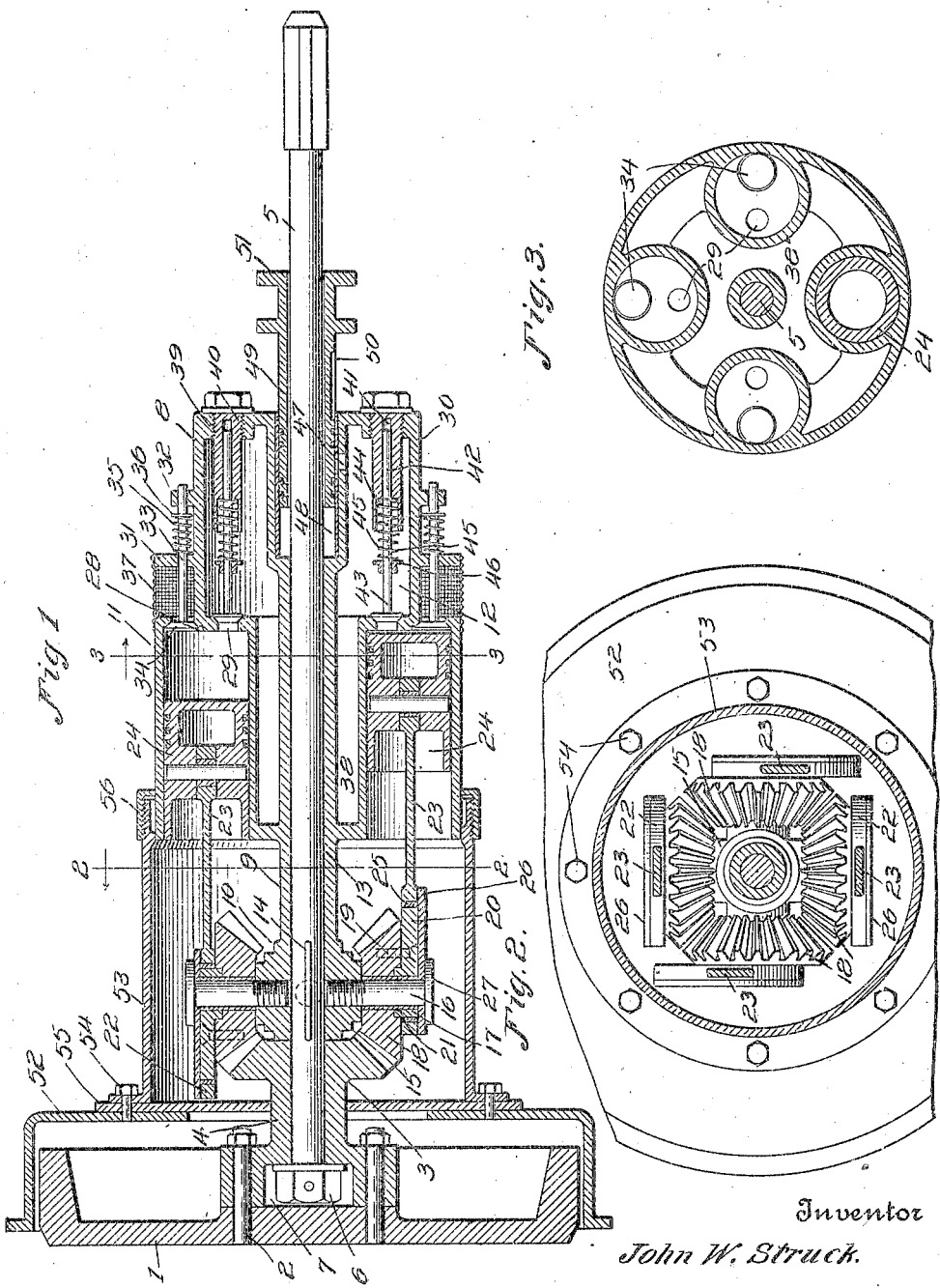

JOHN W. STRUCK, OF SPOKANE, WASHINGTON.

PNEUMATIC TRANSMISSION.

1,399,588.    Specification of Letters Patent.    Patented Dec. 6, 1921.

Application filed January 5, 1920. Serial No. 349,541.

*To all whom it may concern:*

Be it known that I, JOHN W. STRUCK, a citizen of the United States, residing at Spokane, in the county of Spokane and State of Washington, have invented certain new and useful Improvements in a Pneumatic Transmission, of which the following is a specification.

This invention relates in general to improvements in power transmission, and more especially to that type of power transmission embodying a clutch element for gradually delivering the power from a normally active element, the primary or drive shaft, to a passive element, the secondary or driven shaft.

In the majority of power transmissions now in use, serious injury is often caused to the transmission mechanism through shock coincident with throwing in the clutch, in fact the principal function of the so-called friction drive is to reduce such shock and prevent stripping of transmission gears when the driven shaft is suddenly energized. According to the present invention this shock will be positively eliminated although the more efficient gear-transmission is used, and not only will possible stripping of the gears be prevented, but undue wear and strain on the clutch and transmission mechanism will be reduced to a minimum.

A prominent feature of the invention is the utilization of air pressure in effecting the actuation of the clutch element—the gradual increase of such air pressure causing a gradual deliverance of power from the crank or power shaft to the driven shaft. In accomplishing this end a member of the drive element has associated therewith a drive gear which is intermeshed with a plurality of driven gears in the clutch element each of which is eccentrically connected with one of a plurality of pistons operating in cylinders communicating with compression retorts or chambers in a casting or frame keyed to the driven shaft and rotatable therewith, so that as the interval of reciprocation of the pistons is increased due to increasing air pressure in the cylinders and retorts or chambers rotation of the casting and consequently of the driven shaft will be effected until a complete delivery of power from the crank shaft to the driven shaft is accomplished when the air pressure reaches a maximum; at which time the pistons no longer reciprocate but rigidly bind the driven gears against independent rotation.

Furthermore the invention is applicable to incorporation with any type of power and driven mechanism, although it is particularly adaptable for use in connection with motor driven vehicles where refinement in operation and maximum efficiency are necessitated.

The invention still further provides for improved means for relieving the air pressure in the compression retorts in order to release the clutch and sever operative connection between the power and driven elements.

The improvement in the details and arrangements of parts will be apparent from an inspection of the accompanying drawings, in connection with the specific description hereinafter contained, and wherein the preferred embodiment of the invention is disclosed for the purpose of imparting a full understanding of the same.

In the drawings:

Figure 1 is a sectional side elevation of the device in its entirety.

Fig. 2 is a view on the line 2—2 of Fig. 1; and

Fig. 3 is a view on the line 3—3 of Fig. 1.

Referring now more particularly to the several figures of the said drawing and in connection with which like reference numerals will refer to corresponding parts, there is provided, a crank-shaft fly-wheel 1 (the crank-shaft not being shown) to which is rigidly secured through the medium of bolts 2 a beveled drive-gear 3, provided with a medial bore 4 within which is journaled the terminal end of the driven shaft 5; said driven shaft being retained in place by a lock nut and washer 6 housed within a recess 7 formed in the driven gear as illustrated. As the driven shaft 5 is freely movable in the bore 4 independent rotation of the fly-wheel and drive gear is permitted.

The clutch element of the transmission in general terms includes a casting or integral frame having a body portion 8 and a reduced extension 9 provided with an enlarged end or head 10. The body portion is formed to provide cylinders 11 and an air compression chamber or retort 12 communicating therewith, while formed coincident with the longitudinal axis of the body portion, the reduced extension 9 and enlarged end 10 is a bore 13 adapted for the reception of the driven-shaft 5 to which the entire casting or frame is rigidly secured through the medium of a key 14 so that upon rotation of the casting the driven shaft will be actuated. It is understood that these members will be taken up in detail as the description proceeds.

The enlarged end or head 10 of the reduced extension 9 is disposed adjacent the drive gear 3 and has formed thereon a plurality of radially extending bosses 15 centrally bored and screw-threaded to receive the pins 16 carrying suitable bushings 17 and upon which are mounted for rotation beveled gears 18 each meshing with the drive-gear 3; the arrangement of such gears being similar, within certain limitations, to that of the usual planetary gears (see Fig. 2). Secured by countersunk screws or bolts 19 to the outer faces of each of the gears 18 and mounted also upon the pins 16 are eccentrics 20 having depending flanges 21 seated in recesses in the face of the gears 18; said eccentrics being engaged by straps 22 on the piston rods 23 of the pistons 24, suitable bushings 25 being also provided between the straps and eccentrics for an obvious purpose. Plates 26 superposed upon the eccentrics 20 prevent displacement and provide a bearing surface therefor, while heads 27 on the pins 16 complete an operative assembly.

The cylinders 11 which have inlet and outlet ports 28 and 29 respectively, formed therein are cast *en bloc* in the body portion 8 of the casting or frame as above stated and are disposed axially about the driven shaft 5 to receive the pistons 24. Carried rearwardly of the cylinders and communicating therewith through outlet ports 29 is the air compression chamber or retort 12 the side wall 30 of which has spaced annular flanges 31 and 32 provided with openings for receiving the shanks 33 of air-inlet valves 34 of the inlet ports 28. Coil springs 35 on the shanks 33 have their terminals abutting the flange 31 and collars 36 on the valve shanks 33 respectively to hold the valves normally in a closed position. To prevent the ingress of extraneous matter such as sand or dirt through the inlet valve 28 a strip of screening 37 is mounted to engage the flange 31 and adjacent portion of the cylinder walls 11 and extends completely around the casting or frame to form a guard as is clearly illustrated in Fig. 1.

The air compression chamber or retort 12, which is cast integrally with the cylinders 11, extends completely about the driven shaft 5 and beneath the cylinder as at 38 and has formed in the end walls opposite the cylinder outlet ports 29 screw threaded openings 39 for the reception of valve housing 40. Said valve housings 40 are provided with longitudinal openings 41 for the reception of shanks 42 of the valves 43, and the end walls of the openings 41 are recessed as at 44 for receiving coil springs 45 on the shanks 42. Collars 46 on the shanks 42 form an abutment for the coil springs 45 whereby to normally hold the valves 43 in a closing position relative the cylinder outlet ports 29.

From the foregoing it will be seen that upon the suction stroke of the pistons 24 the inlet valves 34 will be raised against the tension of the coil springs 35 admitting air to the cylinders 11, which will be forced through the outlet ports 29 into the compression chamber or retort 12 against the pressure of the coil springs 45 of the cylinder outlet valves 43. As no automatic relief or pressure operated exhaust valve is provided in the air-compression chamber or retort 12 the air-pressure in the retort 12 will increase. Consequently the interval of reciprocation of the piston 24 will be lengthened until the pressure reaches a maximum when the valves 43 will be forced to a closing position with respect to the ports 29 and further movement of the pistons will be impossible.

In order to relieve the air-pressure when desired an exhaust port 47 is formed in the air-compression retort which communicates with an annular chamber 48 between the driven-shaft 5 and the casing or frame, and within which is received a sleeve-valve 49 loosely mounted on the driven-shaft 5 and provided with a longitudinal groove 50 for registration with the exhaust port 47, for an obvious purpose. The outer end of the sleeve-valve 49 is formed with flanges 51 adapted for operative connection with an operating lever or pedal (not shown) for moving the sleeve-valve on the driven shaft 5 to open or close the exhaust port 47 when desired.

Inclosing the clutch and power elements is a housing formed in two sections 52 and 53 between which is bolted as at 54 a partitioning member 55 for separating the fly wheel 1 from the clutch elements, it being pointed out that the clutch elements are necessarily flooded with oil. The housing member 53 extends slightly over the edges of the cylinder portion 11 of the casting or frame and is provided with screw-threads for receiving an annular collar 56. Between the casting and adjacent portion of the housing member 53 suitable packing may be placed for preventing the egress of lubricants from the clutch elements.

In operation upon starting the engine or other source of power the gears 18 are rotated by the drive-gear 3 and consequently the pistons 24 are reciprocated in the cylinders 11 through the action of the eccentrics 20; no motion however is imparted to the casting or driven-shaft 5 until the air pressure in the chamber or retort 12 is increased by the operation of the pistons, whereupon the interval of reciprocation thereof is also lengthened and slight movement is imparted to the casting or frame and consequently to the driven-shaft 5.

The movement increases with the air pressure until the air-pressure in the retort 12 reaches its maximum, whereupon the valves 43 are forced to close the ports 29 and the pistons cease to reciprocate, consequently the casting and driven-shaft rotate in unison with the power or crank shaft. When it is desired to throw out the clutch the sleeve-valve 49 is moved to open the exhaust port 47 thus decreasing the air pressure and permitting the pistons to reciprocate and consequently allowing the gears 18 to rotate with the drive gears 3; whereupon the casting or frame and the driven-shaft 5 will cease to rotate and no power will be delivered from the crank or power shaft to the driven shaft.

As the increase and decrease of air pressure is gradual it is obvious that all shock coincident with throwing in the clutch is eliminated and also that undue wear and strain on the operating mechanism is reduced to a minimum.

Manifestly, the construction shown is capable of considerable modification and such modification as is within the scope of my claim, I consider within the spirit of my invention.

What is claimed is:

In an apparatus of the class described, a drive member having a bevel-gear with a hollow shank fixed thereto, a driven shaft rotatable in said shank, a casting having a fluid chamber and a bore encompassing said driven shaft and provided with an enlarged head fixed to said shaft, opposed stub shafts carried by said head, bevel gears rotatable on said stub shafts and meshing with the gear carried by the drive member, eccentrics fixed to said stub shaft gears, cylinders carried by said casting and each having an exhaust valve opening into said fluid chamber and a valved inlet opening into the atmosphere, pistons reciprocable in said cylinders, pitmen connecting said eccentrics and pistons, and an outlet opening in one wall of said fluid chamber, and a manually operable valve for controlling the discharge through said opening.

In testimony whereof, I affix my signature hereto.

JOHN W. STRUCK.